United States Patent [19]

Christ et al.

[11] Patent Number: 4,836,475
[45] Date of Patent: Jun. 6, 1989

[54] SAFETY SYSTEM ON TRACK GUIDANCE LINES

[75] Inventors: Hubertus Christ, Langenargen; Klaus Niemann, Welzheim; Herbert Mehren, Freiberg, all of Fed. Rep. of Germany

[73] Assignee: Daimler-Benz Aktiengesellschaft, Stuttgart, Fed. Rep. of Germany

[21] Appl. No.: 128,183

[22] Filed: Dec. 3, 1987

[30] Foreign Application Priority Data

Dec. 6, 1986 [DE] Fed. Rep. of Germany ....... 3641708

[51] Int. Cl.$^4$ .............................................. B62D 1/26
[52] U.S. Cl. .................................. 246/169 R; 104/245
[58] Field of Search ................... 246/169 R, 270 R; 104/130, 242, 247, 244.1, 245; 105/215.2

[56] References Cited

U.S. PATENT DOCUMENTS

| 3,558,875 | 1/1971 | Gieskieng | 246/169 R |
|---|---|---|---|
| 3,645,211 | 2/1972 | Gretzchel et al. | 104/245 |
| 3,724,584 | 4/1973 | Varichon | 104/244.1 |
| 3,763,789 | 10/1973 | Olson, Sr. et al. | 104/245 |
| 3,977,487 | 8/1976 | Katayose et al. | 104/244.1 |
| 4,092,930 | 6/1978 | Takemura et al. | 104/245 |
| 4,671,185 | 6/1987 | Anderson et al. | 104/130 |

FOREIGN PATENT DOCUMENTS 2636656 2/1978 Fed. Rep. of Germany.
2739822 3/1979 Fed. Rep. of Germany.

Primary Examiner—Richard A. Bertsch
Attorney, Agent, or Firm—Barnes & Thornburg

[57] ABSTRACT

The invention relates to a safety system on track guidance lines for optionally track-guidable or road-going vehicles with pivotable feeler rollers. To avoid accidents which may be caused by travelling on track guidance lines with feeler rollers not extended or only incompletely extended, the invention provides for there to be a switch, which can be operated by the feeler rollers, to be arranged on each of the two transverse guide barriers, approximately opposite each other on the same level as the feeler rollers of the vehicle, at the beginning of the track guidance line. These switches, if operated together, switch via a control unit an optical display device, located downstream of the switches in the direction of travel of the vehicle, and normally indicating a block signal, to "clear line".

22 Claims, 1 Drawing Sheet

SAFETY SYSTEM ON TRACK GUIDANCE LINES

BACKGROUND AND SUMMARY OF THE INVENTION

The invention relates to a safety system on track guidance lines for optionally track-guidable or road-going vehicles of the type having feeler rollers which roll along lateral transverse guide barriers of the track guidance lines, which feeler rollers can be moved between operating and non-operating position.

A safety system on track guidance lines of the above-noted type is disclosed, for example, in German Unexamined Published Patent Application (DE-OS) No. 2,739,822. In that case it is a signal operating system for the switching of block signals, for example to indicate that a vehicle is occupying a section of the track guidance line. The signal-triggering switches arranged on the trackway side in the transverse guide barriers are operated by the vehicle itself by the feeler rollers running over them.

The above mentioned literature reference does not mention optionally track-guidable or road-going vehicles whose feeler rollers can, in addition, be adjusted between, on the one hand, an operating position close to the ground, used in track-guided operation, and, on the other hand, a retracted rest position, used in road operation. Such a system is disclosed for example in German Published Unexamined Patent Application (DE-OS) No. 2,636,656.

As a rule, the feeler rollers can be moved back and forth between their operating positions and rest positions, operated under remote control and with power assistance from the driver's seat, with the result that a smooth change between track-unbound and track-bound operation is possible without stopping the vehicle. Purely manually operable feeler rollers are described in the applicant's previously unpublished patent application No. P 3538160.4-21, the adjustment of which feeler rollers between extended operating position and retracted rest position only takes place when the vehicle is stationary.

With feeler roller adjustment under remote control and with power assistance, it is possible however that, in spite of the feeler roller adjustment being triggered by the driver—for example by operation of the corresponding feeler roller extension or retraction switch on the instrument panel—the feeler roller or feeler rollers do not move into the desired final position on account of some defect or other.

When changing from track-unbound operation on normal roads to track-bound operation on track guidance lines, such a solution may have as a consequence the collision of the vehicle with the transverse guide barriers, involving an accident of greater or lesser seriousness. However, as well as technical failure, human failure is also, and particularly, conceivable, the vehicle driver simply forgetting to pivot the feeler rollers into the operating position necessary for track guidance operation. This oversight may occur both in the case of vehicles with feeler roller adjustment operated under remote control and with Power assistance, and in the case of vehicles with manual feeler roller adjustment.

An object of the invention is to provide a safety device on track guidance lines with which a satisfactorily extended state of the feeler rollers during entry into a track guidance line is automatically checked and the driver warned, if need be, in good time.

According to the invention, this object is achieved by providing feeler actuated switch control means adjacent the inlet to the track guidance line. When a dual-mode vehicle with movable feeler rollers enters the track guidance line, once the switches arranged in the transverse guide barriers have been passed by the feeler rollers, a clear signal for the rest of the track guidance line is only given by the optical display device if both switches are operated together by the feeler rollers. This is possible, however, only with contact of the feeler rollers against the transverse guide barriers, in other words with completely extended feeler rollers. The clear line signal provides the vehicle driver with reliable information as to whether the feeler rollers of his vehicle have assumed their operating position and thus that safe travelling in track-guided operation is possible, or whether there must be some defect obliging him to interrupt the journey owing to the impending danger of an accident.

Other objects, advantages and novel features of the present invention will become apparent from the following detailed description of the invention when considered in conjunction with the accompanying drawings.

DETAILED DESCRIPTION OF THE DRAWINGS

Figure 1:
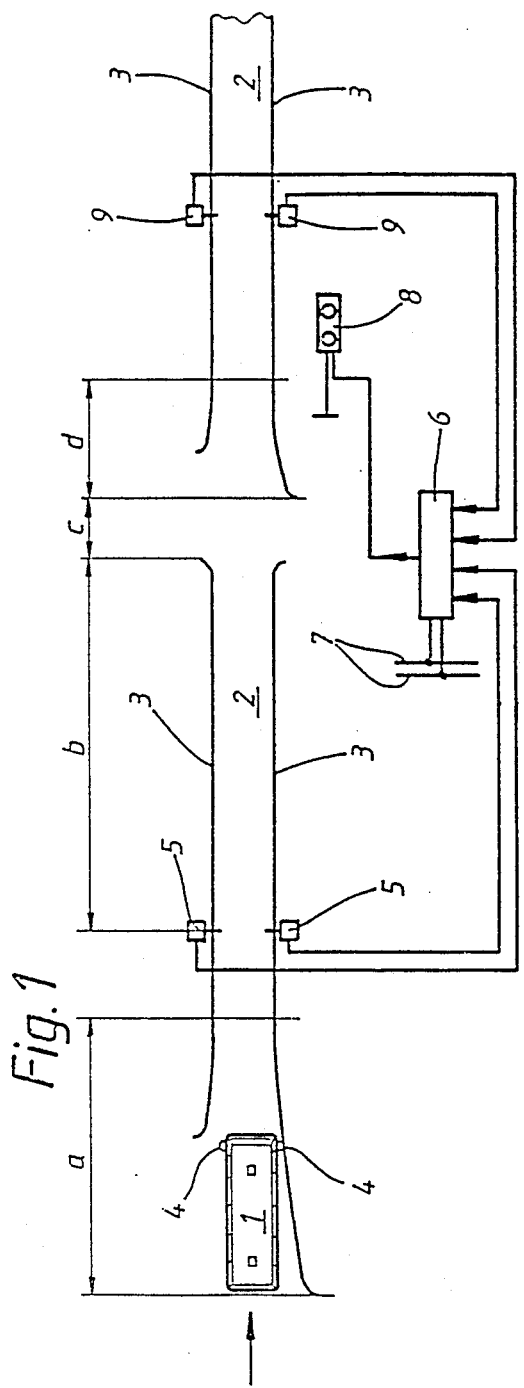
FIG. 1 shows a plan view of a track guidance line provided with a safety device constructed according to a preferred embodiment of the invention.

FIG. 1 shows an optionally track-guidable or road-going, right-hand drive vehicle 1 with feeler roller 4, which can be adjusted between an extended operating position and a retracted rest position, on entry into the track guidance line 2 provided with transverse guide barriers 3. The vehicle 1 is mechanically track-controlled, i.e., the feeler rollers 4 are arranged upstream of the steered front wheels in travel direction (=arrow direction) and are rigidly connected to the stub axles of the front wheels. In operating position, they guide the vehicle along the transverse guide barriers 3 by controlling the steering lock of the front wheels. After the line section a, designed as an entry funnel of the track guidance line 2, the transverse guide barriers 3 of the track guidance line 2 have two switches 5, which can be operated by the feeler rollers 4 of the vehicle 1. Following the line section b, equivalent in length at least to the vehicle braking distance, the transverse guide barriers 3 are interrupted in section c, after which track guidance is resumed in section d with a further entry funnel.

After this line section d, the transverse guide barriers 3 have two further switches 9 which can be operated by the feeler rollers 4 The switch pairs 5 and 9 pass their signals to the control device 6, fed from the power supply 7, the output signal of which control device controls the optical display device 8 placed between the two switch pairs 5 and 9.

For entry of the vehicle 1, provided with right-hand drive in FIG. 1, into the track guidance line 2, the feeler rollers 4 of the vehicle 1 must be extended into operating position to avoid a collision with the transverse guide barriers 3. On entry into the track guidance line 2, the driver runs the driver side of his vehicle against the transverse guide barrier 3, on the driver side, of the entry funnel (line section a), drawn forward as guiding edge. The feeler roller 4 on the driver side then guides the vehicle along this guide edge until the transverse guide barrier 3 has narrowed to normal track width, when the second feeler roller 4 also rolls along against the opposite transverse guide barrier 3. On travelling further into the track guidance line 2, the feeler rollers 4 operate the switches 5, which only when operated together, switch via the control device 6 the optical display device 8, normally indicating a block signal, to "clear line". In this case, the vehicle can continue its journey uninterrupted, since the illumination of the clear line signal also indicates that the feeler rollers are satisfactorily in their operating position. Once the feeler rollers 4 of the vehicle 1 have passed and operated the switches 9, the optical display device 8 is switched back to block signal, with the result that following vehicles are only allowed to drive into the track guidance line with feeler rollers 4 correctly in operating position and triggering the clear line signal.

In the event of a defect in the entry and departure mechanism of one or both feeler rollers, or in the event of inadvertently unextended feeler rollers, it is not possible for the vehicle to operate both switches 5 together. In these cases, the optical display device 8 is not switched to "clear line" and the driver has to bring his vehicle to a standstill immediately to avoid a collision with the transverse guide barriers 3. After covering the vehicle braking distance (line section b), the vehicle comes to a standstill in line section c. In this section c, the driver would then attempt manually to bring the feeler rollers 4 into the operating position necessary for continued travel, or if he has forgotten to adjust the feeler rollers, will extend the feeler rollers there. In cases where the feeler rollers assume a rest position in which they have swung upwards and inwards into the vehicle body, as a rule it is not possible to pivot them from this rest position into the operating position within the track guidance line and between the transverse guide barriers since, on pivoting out, the feeler rollers would either come to rest on the top edge of the transverse guide barrier 3, or bend against the guide surfaces of the transverse guide barriers before reaching the operating position. For this reason, the transverse guide barriers 3 are interrupted in line section c, so that feeler rollers which are pivotable from up to down can also be extended here into operating position. The length of the interruption of the transverse guide barriers 3 is in this case expediently equivalent to a distance which is the same as the tolerance of the braking distance of the vehicles. Two to 3 meters may be regarded as adequate here. After this interruption of the transverse guide barriers, the track guidance line is continued with another entry funnel to facilitate entry positioning into the track guidance line (track section d), which entry funnel may however be shorter in its longitudinal extent than that of line section a, since the interruption of the transverse guide barriers 3 in line section c is only a few meters and the vehicle will only change its direction insignificantly, if at all, over the short distance.

Figure 2:
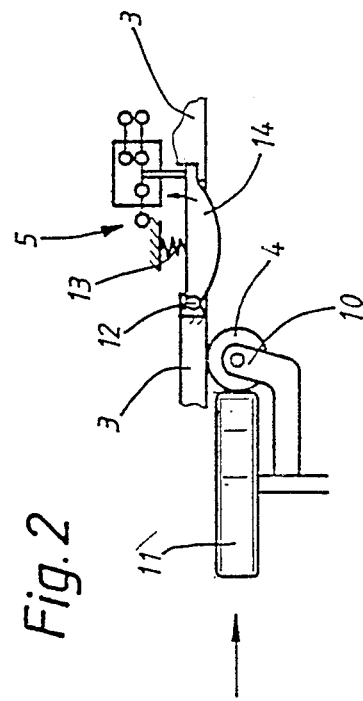
FIG. 2 shows an enlarged plan view of a signal-triggering switch arranged in one of the transverse guide barriers of FIG. 1.

FIG. 2 shows a feeler roller 4, which is arranged on a feeler arm 10 upstream of the steered front wheel 11 in travel direction (=arrow direction) and rolls along on the transverse guide barrier 3. The switch 5 has the hinged lever 14, mounted about the vertical axis of rotation 12 and loaded by a spring 13, the free end of which hinged lever triggers the actual electric switching operation via an intermediate pin.

On running over the hinged lever 14 with the feeler roller 4, said lever pivots about the axis 12 into the transverse guide barrier 3, executing a switching operation, and terminates with its respective overrun parts at least approximately flush with the Outer Contour of the transverse guide barriers 3 on the trackway side. In the unoperated state, the pivoted lever 14 protrudes by an amount equivalent to approximately twice the width tolerance of the opposite feeler rollers 4 (15 to 20 mm) from the outer contour of the transverse guide barriers 3 on the trackway side, which ensures that a switching operation can be triggered even with worn feeler rollers. To make it possible to travel along the line in the opposite direction as well, for example with a mountain vehicle, the hinged levers 14 are contoured in plan view to the shape of the ground on the side facing the trackway, and thus can be run over on both sides.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Safety system on track guidance lines for optionally track-guidable or road-going vehicles having lateral sides, with feeler rollers on each lateral side which roll along lateral transverse guide barriers of the track guidance line, the feeler rollers of both sides simultaneously being adjustable between an operating position close to the ground, used in track-guided operation and a retracted rest position, used in road operation, wherein a switch, which can be operated by the feeler rollers, is arranged on each of the two transverse guide barriers, approximately opposite each other on the same level as the feeler rollers of the vehicle when adjusted to the operating position, at the beginning of the track guidance line, after narrowing of the transverse guidance sections which are initially widened in the manner of a funnel, to normal track width, which switches, if operated together, switch via a control device an optical display device, located downstream of the switches in the direction of travel of the vehicle, and normally indicating a block signal, to "clear line".

2. Safety system according to claim 1, wherein two further opposite switches which can be operated by the feeler rollers are arranged on the transverse guided barriers, at a distance, in a vehicle travel direction, from the switches exceeding the vehicle braking distance and downstream of the optical display device, which switches, when operated together, switch via the control device the optical display device to indicate a stop signal.

3. Safety system according to claim 2, wherein the switches each have a hinged lever, which projects under the influence of a spring into the trackway and can be pivoted on one side about a vertical axis and, in the operated state, terminates at least approximately flush with the outer contour of the transverse guide barriers on the trackway side.

4. Safety system according to claim 3, wherein the hinged levers protrude, in the unoperated state, by an amount equivalent to approximately twice the width tolerance of the opposite feeler rollers from the outer contour of the transverse guide barriers on the trackway side.

5. Safety system according to claim 2, wherein the transverse guide barriers are interrupted in vehicle travel direction at a distance from the first switch pair, which is equivalent to at least the vehicle braking distance but upstream of the second switch pair.

6. Safety system according to claim 5, wherein after the interruption of the transverse guide barriers, the track-guided line again begins with an entry funnel with transverse guide barriers initially extending relatively far apart.

7. Safety system according to claim 6, wherein the length of the interruption of the transverse guide barriers is equivalent to the tolerance of the vehicle braking distance.

8. Safety system according to claim 7, wherein the switches each have a hinged lever, which projects under the influence of a spring into the trackway and can be pivoted on one side about a vertical axis and, in the operated state, terminates at least approximately flush with the outer contour of the transverse guide barriers on the trackway side.

9. Safety system according to claim 8, wherein the hinged levers protrude, in the unoperated state, by an amount equivalent to approximately twice the distance of the opposite feeler rollers from the outer contour of the transverse guide barriers on the trackway side.

10. Safety system according to claim 1, wherein the switches each have a hinged lever, which projects under the influence of a spring into the trackway and can be pivoted on one side about a vertical axis and, in the operated state, terminates at least approximately flush with the outer contour of the transverse guide barriers on the trackway side.

11. Safety system according to claim 10, wherein the hinged levers protrude, in the unoperated state, by an amount equivalent to approximately twice the width tolerance of the opposite feeler rollers from the outer contour of the transverse guide barriers on the trackway side.

12. Safety system according to claim 10, wherein the hinged levers are contoured in plan view on the side facing the trackway such that they can be run over on both sides.

13. Safety system on track guidance lines for optionally track-guidable or road-going vehicles with feeler rollers which roll along lateral transverse guide barriers of the track guidance line and can be adjusted between an operating position close to the ground, used in track-guided operation and a retracted rest position, used in road operation, wherein a switch, which can be operated by the feeler rollers, is arranged on each of the two transverse guide barriers, approximately opposite each other on the same level as the feeler rollers of the vehicle, at the beginning of the track guidance line, after narrowing of the transverse guidance sections which are initially widened in the manner of a funnel, to normal track width, the switches each have a hinged lever, which projects under the influence of a spring into the trackway and can be pivoted on one side about a vertical axis and, in the operated state, terminates at least approximately flush with the outer contour of the transverse guide barriers on the trackway side, while in the unoperated state, protrude by an amount equivalent to approximately twice the distance of the opposite feeler rollers from the outer contour of the transverse guide barriers on the trackway side, which switches, if operated together, switch via a control device an optical display device, located downstream of the switches in the direction of travel of the vehicle, and normally indicating a block signal to "clear line".

14. Safety system according to claim 13, wherein the hinged levers are contoured in plan view on the side facing the trackway such that they can be run over on both sides.

15. Safety system according to claim 13, wherein two further opposite switches which can be operated by the feeler rollers are arranged on the transverse guided barriers, at a distance, in a vehicle travel direction, from the switches exceeding the vehicle braking distance and downstream of the optical display device, which switches, when operated together, switch via the control device the optical display device to indicate a stop signal.

16. Safety system according to claim 15, wherein the further switches each have a hinged lever, which projects under the influence of a spring into the trackway and can be pivoted on one side about a vertical axis and, in the operated state, terminates at least approximately flush with the outer contour of the transverse guide barriers on the trackway side.

17. Safety system according to claim 16, wherein the hinged levers of the further switches protrude, in the unoperated state, by an amount equivalent to approximately twice the distance of the opposite feeler rollers from the outer contour of the transverse guide barrier on the trackway side.

18. Safety system according to claim 15, wherein the transverse guide barriers are interrupted in vehicle travel direction at a distance from the first switch pair, which is equivalent to at least the vehicle braking distance but upstream of the second switch pair.

19. Safety system according to claim 18, wherein after the interruption of the transverse guide barriers, the track-guided line again begins with an entry funnel with transverse guide barriers initially extending relatively far apart.

20. Safety system according to claim 19, wherein the length of the interruption of the transverse guide barriers is equivalent to the vehicle braking distance.

21. Safety system according to claim 19, wherein the further switches each have a hinged lever, which projects under the influence of a spring into the trackway and can be pivoted on one side about a vertical axis and, in the operated state, terminates at least approximately flush with the outer contour of the transverse guide barriers on the trackway side.

22. Safety system according to claim 21, wherein the hinged levers of the further switches protrude, in the unoperated state, by an amount equivalent to approximately twice the distance of the opposite feeler rollers from the outer contour of the transverse guide barriers on the trackway side.

* * * * *